Oct. 6, 1959 R. W. ROBERTS 2,907,361
CLOSING DRIVE FOR 'C' CLAMP
Filed June 30, 1958
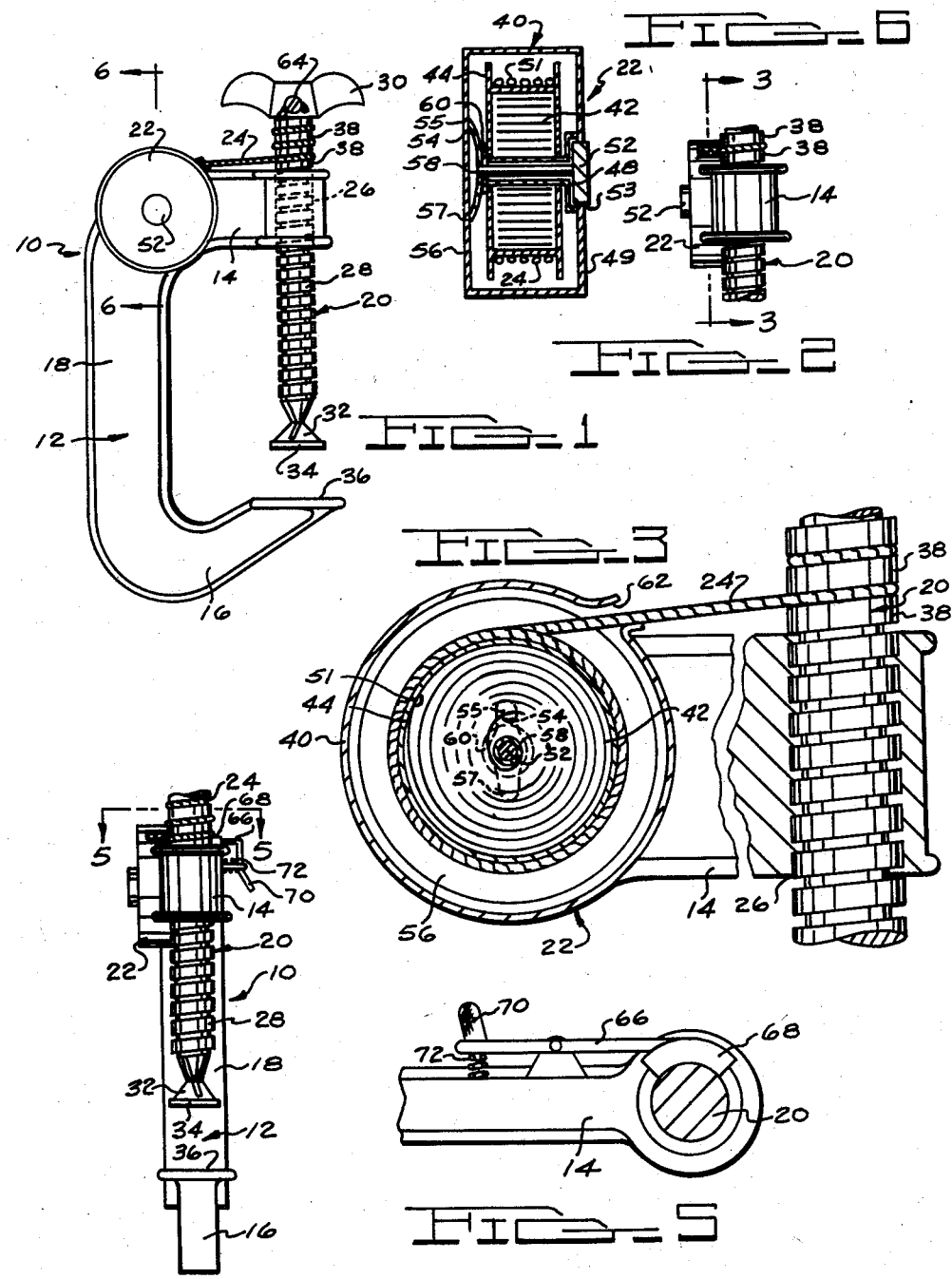
INVENTOR.
ROLLA W. ROBERTS
BY
SMITH, WILSON, LEWIS & McRAE

2,907,361
CLOSING DRIVE FOR C CLAMP

Rolla W. Roberts, Taylor Center, Mich.

Application June 30, 1958, Serial No. 745,447

7 Claims. (Cl. 144—305)

This invention relates to a C-clamp provided with a mechanically operated closing drive for securing the clamp in place. More particularly, the present invention relates to a C-clamp having a standard C-shaped body and clamping screw and further provided with a power device operatively connected to the screw whereby to drive the screw into clamping engagement with an object placed in the clamp.

It is an important object of this invention to provide a C-clamp having a closing drive for the clamping screw.

Another object of this invention is the provision of a C-clamp having a standard C-shaped body with a clamping screw threadingly engaging one arm of the C and provided with a power device on the C-shaped body to wind a flexible element operatively connected to the clamping screw whereby the clamping screw may be mechanically driven as desired by energization of the power device.

It is another object of the invention to utilize the grooves formed by the threads of the clamping screw to seat the flexible element of the power device.

Another object is to provide a power device with a brake mechanism whereby the power device may be selectively energized.

Another object is to provide an alternate construction wherein a brake mechanism is provided on the C-shaped body to control the rotation of the clamping screws.

A further object is to provide such a C-clamp having a closing drive whereby, for example, carpenters and metal workers may quickly and easily clamp various objects into place with the use of only one hand.

Other objects of this invention will appear in the following description and appended claims, reference being had to the accompanying drawings forming a part of this specification wherein like reference characters designate corresponding parts in the several views.

In the drawings:

Fig. 1 is a side elevational view of one embodiment of the C-clamp of the present invention.

Fig. 2 is a segmental front elevational view of the C-clamp of Fig. 1.

Fig. 3 is a sectional view taken substantially along the line 3—3 of Fig. 2 looking in the direction of the arrows.

Fig. 4 is a segmental front elevational view of the C-clamp showing a second embodiment of the present invention.

Fig. 5 is a sectional view taken substantially along the line 5—5 of Fig. 4 looking in the direction of the arrows.

Fig. 6 is a sectional view of the power device taken substantially along the line 6—6 of Fig. 1 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In its broadest aspects, the present invention, as may be seen in Fig. 1 comprises a C-clamp 10 having a C-shaped body 12 which includes first and second end pieces 14, 16 connected by a web member 18 and having a clamping screw 20 threadingly engaging the first end piece 14 whereby the C-clamp 10 may be fastened to an object placed between the lower end piece 16 and the screw 20 by threading the screw 20 into engagement therewith. According to the present invention, a power device 22 is secured to the C-shaped body 12 and a flexible element 24 is provided operatively connected between the power device 22 and the clamping screw 20 whereby energization of the power device is effective, via the flexible element, to drive the screw 20.

The construction of the C-clamp is best illustrated in Figs. 1 and 4. The upper or first end piece 14 of the body 12 terminates at its outer end in a threaded opening 26 which threadingly receives the screw 20. The screw 20 comprises a threaded portion 28 having a knob or handle 30 at the upper end for manually driving the screw 20 towards or away from the second or lower end piece 16. The lower end of the screw 20 adjacent the second end piece 16 is provided with a pivotally mounted element 32 having a flat lower clamping surface 34 for engagement with the object to be clamped or secured. The second end piece 16 terminates in a flat clamping surface 36 which is substantially parallel to the clamping surface 34 of the pivotal element 32 and cooperates therewith in the clamping procedure.

The power device 22 may be conveniently mounted on the body 12 at the intersection of the upper end piece 14 and the web 18 whereby the flexible element 24 may extend at substantially right angles from the power device 22 to the screw 20 to develop maximum driving torque and also may be seated in the grooves of the threads 38 immediately adjacent the end piece 14 whereby the flexible element 24 may be wrapped around the major portion of the screw 20 projecting from the end piece 14.

The power device 22, as shown in Figs. 3 and 6, may comprise a circular housing 40 within which is provided an axially extended hollow tubular member 48 fixedly mounted to one side wall 49 of the housing 40. The tubular member 48 carries a flat spiral spring 42 which is secured thereto at its inner end. The outer end 51 of the spring 42 is fastened to the inner periphery of a hollow spool 44 whereby, upon being wound up, the spring 42 will operate to rotate the spool 44 about the tubular member 48. A brake mechanism is provided within the housing 40 to control the rotation of the spool 44 and consequently the action of the spring 42. The brake mechanism comprises an operating rod 52 which extends from without the housing 40 through an opening 53 in the housing wall 49 and through the tubular member 48 and spool 44. The inner end of the rod 52 carries a flat U-shaped spring member 54, which is located between the spool 44 and the side wall 56 of the housing 40. As a result of the spring 54 tending to assume a normal U-shaped configuration, the outer ends 55, 57 of the spring 54 bear against the housing wall 56 and the central portion 58 normally bears against the spool 44 to normally prevent rotation of the spool 44. A friction type washer 60 may be carried by the rod 52 between the spool 44 and spring 54 to provide adequate braking friction between these elements. The brake spring 54 may be disengaged from the spool 44 by depression of the operating rod 52 which will spread the spring 54. When the spiral spring 42 is thus energized, it will cause the spool 44 to rotate and wind up the flexible element 24 which is secured thereto.

The flexible element 24, which may, for example, be a fibre, plastic or metal cord, extends from the spool 44 through an opening 62 in the housing 40 and may be attached to the outer or upper end of the clamping screw 20 by means of a machine screw 64. When the screw 20 is threaded outwardly to open the clamp 10, the flexible element 24 will be wrapped therearound and seat in the grooves of the threads 38 as shown in the various figures. As the flexible element 24 is wrapped around the screw 20 it unwinds from the spool 44 and causes the spring 42 to be wound up. Depression of the rod 52 will cause the reverse procedure to take place with the flexible element 24 being wrapped around the spool 44 and unwinding from the screw 20 since the torque exerted upon the screw 20 by means of the flexible element 24 is at all times sufficient to cause the screw 20 to rotate and be threaded inwardly towards the end piece 16. This action will, of course, stop when the screw 20 contacts an object placed between the flat clamping surfaces 34, 36. After the screw 20 has been advanced to the clamped object, it need only be given a slight manual twist in order to secure the clamp 10 firmly.

A second embodiment of the present invention is shown in Figs. 4 and 5. In this embodiment there need be no brake mechanism provided within the power device 22. Instead a brake mechanism is provided on the C-shaped body 12 to directly control the movement of the screw 20. It has been found that this is a preferable control mechanism in some instances since the screw 20, due to the inertia it builds up while being driven by the power device 22, will continue travelling after the spool 44 has been stopped and cause the flexible element 24 to foul up. The brake mechanism comprises a brake arm 66 pivotally mounted intermediate its ends to the end piece 14. One end of the arm 66 carries a brake shoe 68 which normally brakingly engages the screw 20. The brake may be released and the screw 20 allowed to advance upon depression of the opposite end of the arm 66 by applying pressure to the thumb lever 70. A compression spring 72 is provided beneath the thumb lever 70 secured at one end to the end piece 14 and at the other end to the outer end of the arm 66. The spring 72 will return the arm 66 to its normal position after being depressed and will constantly urge the shoe 68 into braking engagement with the screw 20.

As may be seen, the present invention provides a C-clamp which may be quickly and easily secured in place and which requires the use of only one hand, allowing the workman to use his other hand for holding or locating various objects which are to be clamped. A further advantage of the present invention is that the clamp 10 may be conveniently utilized in limited spaces where it would be very difficult to advance the clamping screw by hand.

Having thus described my invention, I claim:

1. A C-clamp comprising a C-shaped body including first and second end pieces connected by a web member and having a clamping screw threadingly engaging the first end piece; said clamping screw adapted to cooperate with the second end piece to clampingly engage an object placed therebetween; a rotating tensioning device on the C-shaped body; and a flexible element operatively connected at one end to the tensioning device and at the other end to the clamping screw; said flexible element wrapped around the screw in the grooves formed by the threads thereof extending out of the C-shaped body whereby rotation of the tensioning device is effective to wind-up the flexible element and drive the screw towards the second end piece.

2. In a C-clamp comprising a C-shaped body including first and second end pieces connected by a web member and having a clamping screw threadingly engaging the first end piece; said clamping screw adapted to cooperate with the second end piece to clampingly engage an object placed therebetween; the improvement consisting of a rotating power device on the C-shaped body comprising a casing in which is mounted a flat spiral spring operatively connected to a spool; and a flexible element operatively connected at one end to the spool and wrapped therearound; said flexible element being connected at the other end to the clamping screw and wrapped around the screw in the grooves formed by the threads thereof extending out of the C-shaped body whereby rotation of the power device is effective, via the flexible element, to drive the screw towards the second end piece.

3. The device as claimed in claim 2 and further characterized in that the power device is provided with a brake mechanism operatively connected between the spring and casing; said brake mechanism being provided with a depressible operating rod extending from the casing to release the brake and energize the spring.

4. The device as claimed in claim 2 and further characterized in that the C-clamp is provided with a brake mechanism secured to the C-shaped body comprising an arm pivotally connected to the C-shaped body having a brake shoe at one end in normal braking engagement with the clamping screw; resilient means operatively connected to the other end of the arm constantly urging the shoe into braking engagement with the clamping screw; said braking mechanism being releasable by means of depression of the resilient means.

5. The device as claimed in claim 2 and further characterized in that a brake mechanism is provided on the C-shaped body to releasably engage the clamping screw against rotation.

6. A power device for driving a screw comprising a rotating tension device secured to a support; said tensioning device including a casing in which is mounted a flat spiral spring operatively connected to a spool; and a flexible element operatively connected at one end to the spool and wrapped therearound; a female threaded member adjacent said tensioning device; a screw threadingly engaged in said threaded member; said flexible element operatively connected to the screw and wrapped therearound in the grooves formed by the threads thereof extending out of the threaded member whereby rotation of the power device is effective to wind-up the flexible element and drive the screw.

7. A power device for driving a screw comprising a rotatable tensioning device mounted on a support; a flexible element operatively connected to the tensioning device; a female threaded member positioned adjacent the tensioning device; a screw threadingly engaged in said threaded member; said flexible element connected to the screw and wrapped therearound in the grooves formed by the threads thereof extending out of the threaded member; said tensioning device being effective to wind-up the flexible element and drive the screw.

References Cited in the file of this patent

UNITED STATES PATENTS

| | | |
|---|---|---|
| 1,846,422 | Hands | Feb. 23, 1932 |
| 2,130,504 | McClane | Sept. 20, 1938 |
| 2,157,338 | Jackson | May 9, 1939 |
| 2,610,662 | Ratcliff | Sept. 16, 1952 |
| 2,623,427 | Ornstein | Dec. 30, 1952 |
| 2,732,148 | Lummis | Jan. 24, 1956 |